United States Patent [19]

Hunsucker

[11] 3,725,350
[45] Apr. 3, 1973

[54] POLYMERIC SUBSTANCES COMPRISING THE REACTION PRODUCT OF MELAMINE, ALDEHYDE AND OXAZOLIDINES

[76] Inventor: Jerry H. Hunsucker, c/o Commercial Soluents Corp., Terre Haute, Ind. 47808

[22] Filed: Apr. 26, 1972

[21] Appl. No.: 247,680

Related U.S. Application Data

[63] Continuation-in-part of Ser. No. 36,679, May 12, 1970, abandoned.

[52] U.S. Cl...........260/67.5, 117/128.4, 117/132 BF, 117/155 L, 117/161 LN, 260/29.4 R, 260/67.6 R
[51] Int. Cl. ...............................................C08g 9/30
[58] Field of Search ..........................260/67.5, 67.6 R

[56] References Cited

UNITED STATES PATENTS

| | | | |
|---|---|---|---|
| 2,448,890 | 9/1948 | Johnston | 260/307 |
| 2,517,128 | 8/1950 | Meunier et al. | 260/67.5 |

*Primary Examiner*—Howard E. Schain
*Attorney*—Howard E. Post et al.

[57] ABSTRACT

Prepolymeric resinous compositions from an oxazolidine and melamine and a lower aliphatic aldehyde. The resinous compositions polymerize on heating and have utility in baking enamels and in electrodeposition formulations to increase the solvent resistance of the film.

10 Claims, No Drawings

POLYMERIC SUBSTANCES COMPRISING THE REACTION PRODUCT OF MELAMINE, ALDEHYDE AND OXAZOLIDINES

CROSS-REFERENCE TO RELATED APPLICATIONS

This application is a continuation-in-part of U.S. Ser. No. 36,679, filed May 12, 1970, now abandoned.

BACKGROUND OF THE INVENTION

This invention relates to polymeric substances. In a particular aspect, this invention relates to polymeric, resinous products useful in baking enamels and electrodeposition formulations.

Oxazolidines (including mono-oxazolidines and the bicyclo-aza-dioxo-octanes) have been known from the time of Senkus, J. Am. Chem. Soc., 67, 1515–1559 (1945). William B. Johnston, U.S. Pat. No. 2,448,890, disclosed reacting bicyclic oxazolidines with fatty acids to yield esters, which had the properties of drying oils.

Baking enamels applied by spraying and dipping are well known coating materials that are used in large quantities but the industry is ever in need of improvements in these compositions relative to improved flexibility, improved adhesion to metal substrates, resisting corrosion of the metal substrates, improved drying rate, as well as improvements in many of the other important properties.

Another class of coatings that have come into more recent widespread uses are electrodeposition resins wherein a substrate is immersed in an aqueous dispersion of the resin, an electric current is passed through the medium and the resin is deposited upon the substrate. The resinous coating is then baked to achieve the desired properties. These coatings have tended to suffer from some of the same disadvantages as the earlier baking enamels and consequently there exists a need for improving them.

SUMMARY OF THE INVENTION

It is an object of the present invention to provide new polymeric substances.

It is another object of this invention to provide polymeric resinous products useful in baking enamels and electrodeposition formulations.

Other objects will be apparent to those skilled in the art from the disclosure herein.

It has been discovered that improved baking enamels and formulations for electrodepositions are obtained by reacting a monocyclic oxazolidine corresponding to the formula

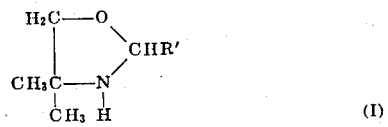

(I)

wherein R' is hydrogen or an alkyl group of one to three carbon atoms or a bicyclic oxazolidine corresponding to the formula

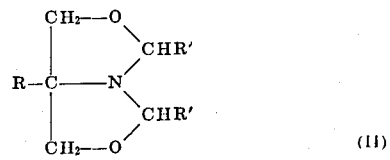

(II)

where R is hydrogen, methyl, ethyl, hydroxymethyl or the group

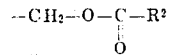

wherein $R^2$ is a saturated or unsaturated aliphatic hydrocarbon group of from 1 to 21 carbon atoms and R' has the same meaning defined above, with melamine and a lower aliphatic aldehyde, by mixing the ingredients and heating under reflux for a length of time sufficient to form the prepolymeric resinous composition.

DETAILED DISCUSSION

The resinous composition of the present invention includes the condensation product of an oxazolidine corresponding to the foregoing formulas I or II with melamine and a lower aliphatic aldehyde. The condensation is effected by heating a mixture of the reactants at reflux temperature, i.e., at from about 95° C to about 110° C, for about 1 to 3 hours.

In preparing the melamine-oxazolidine-formaldehyde resinous compositions, a mole ratio of about 1.5–2.5 moles of oxazolidine are used per mole of melamine, and about 1 to 2 moles of aldehyde are employed per mole of melamine. The reaction is conducted in the presence of a lower alkyl alcohol having from one to four carbon atoms.

The resinous compositions of the present invention are hard, clear, colorless and solvent resistant when baked at a temperature and for a length of time suitable to effect complete polymerization, e.g., at about 350°F for from 10 to 15 minutes, yet they are not brittle. They are suitable for use as the vehicle in baking enamels and paper coatings. They can be readily dispersed in water with suitable dispersing agents, many of which are known, and are especially useful in coatings applied by electrodeposition.

Some of the oxazolidines used in the practice of this invention are commercially available and the usual commercial materials are suitable. 4,4-Dimethyloxazolidine is generally known as Oxazolidine A and this designation is employed in the examples. The bicyclic oxazolidine wherein R is ethyl is known as Oxazolidine E and this designation is used in the examples. The bicyclic oxazolidine wherein R is hydroxymethyl is known as Oxazolidine T and this designation is used in the Examples. Other oxazolidines, i.e., esters thereof and those made from aldehydes other than formaldehyde, can be made by the method of M. Senkus or Wm. B. Johnson.

Aliphatic aldehydes useful in preparing the compositions include the lower aliphatic aldehydes of from one to four carbon atoms, e.g., formaldehyde, acetaldehyde, propionaldehyde, and n- and iso-butyraldehyde. These materials are commercially available and the usual commercial materials are suitable.

The melamine used in the practice of this invention is commercially available and the usual commercial material is suitable.

The invention will be better understood with reference to the following examples. It is understood, however, that these examples are intended as illustrations only and are not to be considered as limiting the invention.

EXAMPLE 1

A resin was formed by mixing the following ingredients in a reaction vessel equipped with a thermometer, stirrer, reflux condenser and take-off head:

| | |
|---|---|
| Melamine (1 mole) | 126 g |
| Oxazolidine E (1.5 mole) | 214 |
| Formaldehyde (162 g of 37% aqueous solution, 2 mole) | 60 |
| 2-Butanol | 210 |

The solution was heated to reflux temperature, about 94° C, for 2 hours. Water and some of the 2-butanol were then separated by distillation as the azeotrope (95 ml) over a period of about 45 minutes. It was allowed to cool to room temperature and the properties were determined. A wet film, 1.5 mil thick, was drawn down on a standard steel Q panel and was then baked. Properties of the solution and of the baked film are given in the table.

EXAMPLE 2

The experiment of Example 1 was repeated except that the following ingredients were used:

| | |
|---|---|
| Melamine (1 mole) | 126 g |
| Oxazolidine E (2.5 moles) | 357 |
| Water | 200 |
| Formaldehyde (81 g of 37% solution) | 30 |

Reflux temperature was about 140° C and water was removed over a period of 1 hour after a previous 2 hour reaction period. A wet film of 1½ mil thickness was drawn down on a standard steel Q panel and was then baked. Properties of the solution and of the baked film are given in the table.

TABLE

Summary of Results

| Example No. | 1 | 2 |
|---|---|---|
| Properties of Sol'n. | | |
| Color, Gardner | 1 | 2 |
| Viscosity, Gardner | J | 0 |
| Solids Content | 55%+ | |
| Baking temp., °F | 350 | 350 |
| Baking time, min. | 10 | 15 |
| Properties of Film | | |
| Film hardness | 6H | 6H |
| Flexibility, passes | ⅛" | |
| Reverse impact, lb. | | <10 |

EXAMPLE 3

The experiment of Example 1 is repeated except that Oxazolidine T is substituted for Oxazolidine E on an equi-molar basis. The resulting resinous composition is useful in baked coatings.

EXAMPLE 4

The experiment of Example 1 is repeated except that Oxazolidine A is substituted for Oxazolidine E on a 2:1 molar basis. The resulting resinous composition is useful in baked coatings.

EXAMPLE 5

The experiment of Example 1 is repeated except that acetaldehyde is substituted for formaldehyde on an equi-molar basis. The resulting resinous composition is useful in baked coatings.

EXAMPLE 6

The experiment of Example 1 is repeated except that propionaldehyde is substituted for formaldehyde on an equi-molar basis. The resulting resinous composition is useful in baked coatings.

EXAMPLE 7

The experiment of Example 1 is repeated except that n-butyraldehyde is substituted for formaldehyde on an equi-molar basis. The resulting resinous composition is useful in baked coatings.

EXAMPLE 8

The experiment of Example 1 is repeated except that iso-butyraldehyde is substituted for formaldehyde on an equi-molar basis. The resulting resinous composition is useful in baked coatings.

EXAMPLE 9

The experiment of Example 1 is repeated except that 2 moles of 4,4-dimethyloxazolidine is substituted for Oxazolidine E. The resulting resinous composition is useful in baked coatings.

EXAMPLE 10

The acetate ester of Oxazolidine T is prepared in accordance with the method of Danielson, U.S. Pat. No. 3,256,137. The experiment of Example 1 is repeated in all essential details except that the resulting Oxazolidine T acetate is substituted for Oxazolidine E on an equi-molar basis. The resulting resinous composition is useful in baked coatings.

EXAMPLE 11

The lauric acid ester of Oxazolidine T was prepared as follows:

Oxazolidine T, 145 g (1 product mole) was charged to a one-liter flask equipped with an agitator, thermometer and a decanter head mounted on an 18 inch Vigreaux distillation column. Lauric acid, 200 g (1 mole) and 15 ml benzene were added and the mixture was heated to 185° C for 2 hours after which time the esterification was judged to be complete as indicated by removal of about 1 mole of water. The benzene was removed by distillation and the produce was allowed to cool.

The crude product was a red-brown liquid having a neutralization equivalent of 359.2. The infrared spectrum was consistent with that of an oxazolidine having an ester linkage (absorption peak at 1735 cm$^{-1}$).

A portion of the crude oxazolidine ester was recrystallized from methanol yielding a white crystalline product having the following properties:

| | Found | Expected |
|---|---|---|
| Neutral equivalent | 341 | 327 |
| Acid No. | 2.9 | none |
| Saponification No. | 166.3 | 171 |
| N, % | 4.16 | 4.28 |
| C, % | 66.07 | 66.0 |
| H, % | 9.97 | 10.1 |
| Melting point | 33°–34°C | |

The experiment of Example 1 is repeated in all essential details except that the resulting Oxazolidine T laurate is substituted for Oxazolidine E on an equi-molar basis. The resulting resinous composition is useful in baked coatings.

EXAMPLE 12

Oxazolidine T is esterified with behenic acid in accordance with Example 11. The experiment of Example 1 is repeated in all essential details except that the resulting Oxazolidine T behenate is substituted for Oxazolidine E on an equi-molar basis. The resulting resinous composition is useful in baked coatings.

EXAMPLE 13

The oxazolidine wherein R' of formula I is methyl is prepared by reacting 2-amino-2-methyl-1-propanol with acetaldehyde according to the method of M. Senkus, cited hereinbefore. The oxazolidine thereby obtained is substituted on an equi-molar basis for Oxazolidine E in Example 1, which is repeated in all essential details.

EXAMPLE 14

The experiment of Example 2 is repeated in all essential details except that in place of Oxazolidine E, there is substituted on an equi-molar basis, the oxazolidine corresponding to formula II obtained by reacting 2-amino-2-methyl-1, 3-propanediol with butyraldehyde according to the method of Senkus hereinbefore cited.

I claim:

1. A prepolymer resinous composition comprising the condensation product of an oxazolidine with melamine and an aliphatic aldehyde of from one to four carbon atoms, said oxazolidine corresponding to the formula:

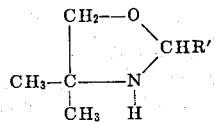

wherein R' is hydrogen or an alkyl group of one to three carbon atoms, or corresponding to the formula:

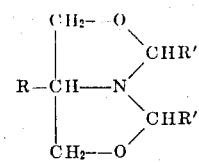

wherein R is hydrogen, methyl, ethyl, hydroxymethyl or the group

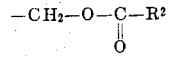

wherein $R^2$ is a saturated or unsaturated aliphatic hydrocarbon group of from one to 21 carbon atoms, and R' has same meaning hereinbefore defined, said oxazolidine, said melamine and said aldehyde being in a mole ratio of 1.5–2.5:1:1–2, respectively.

2. The composition of claim 1 wherein said aldehyde is formaldehyde.
3. The composition of claim 1 wherein said oxazolidine is 4,4-dimethyloxazolidine.
4. The composition of claim 1 wherein said oxazolidine corresponds to the formula

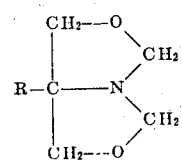

where R is hydrogen, methyl, ethyl or hydroxymethyl.

5. The composition of claim 1 wherein said aldehyde is acetaldehyde.
6. The composition of claim 1 wherein said aldehyde is propionaldehyde.
7. The composition of claim 1 wherein said aldehyde is n-butyraldehyde.
8. The composition of claim 1 wherein said aldehyde is iso-butyraldehyde.
9. The composition of claim 4 wherein R is methyl.
10. The composition of claim 4 wherein R is ethyl.

* * * * *